United States Patent [19]
Brady et al.

[11] Patent Number: 5,970,422
[45] Date of Patent: Oct. 19, 1999

[54] METHOD FOR GENERATING A FLOW PROFILE OF A WELLBORE FROM PULSED NEUTRON LOGS

[75] Inventors: Jerry L. Brady, Anchorage, Ak.; James J. Kohring, Packer, Colo.; Robert J. North, Anchorage, Ak.

[73] Assignee: Atlantic Richfield Company, Los Angeles, Calif.

[21] Appl. No.: 08/939,359

[22] Filed: Sep. 29, 1997

[51] Int. Cl.$^6$ .................................................. G06F 19/00
[52] U.S. Cl. .......................................... 702/12; 73/152.29
[58] Field of Search ................. 702/12, 13; 166/250.03; 73/152.18, 152.21, 152.29, 152.31; 175/48

[56] References Cited

U.S. PATENT DOCUMENTS

| | | | |
|---|---|---|---|
| 4,378,047 | 3/1983 | Elliott et al. | 166/68 |
| 4,531,584 | 7/1985 | Ward | 166/265 |
| 4,531,593 | 7/1985 | Elliott et al. | 175/71 |
| 4,610,793 | 9/1986 | Miller | 210/767 |
| 4,981,175 | 1/1991 | Powers | 166/265 |
| 4,995,456 | 2/1991 | Cornette et al. | 166/51 |
| 5,343,945 | 9/1994 | Weingarten et al. | 166/105.5 |
| 5,385,446 | 1/1995 | Hays | 415/202 |
| 5,431,228 | 7/1995 | Weingarten et al. | 166/357 |
| 5,450,901 | 9/1995 | Ellwood | 166/266 |
| 5,482,117 | 1/1996 | Kolpak et al. | 166/265 |
| 5,605,193 | 2/1997 | Bearden et al. | 166/370 |
| 5,730,871 | 3/1998 | Kennedy et al. | 210/512.2 |
| 5,794,697 | 8/1998 | Wolflick et al. | 166/265 |

OTHER PUBLICATIONS

"Jet Pumping" by Hal Petrie, Chapter 6 of "The Technology of Artificial Lift Methods"–vol. 2b.

"Improved Production Log Interpretation in Horizontal Wells Using Pulsed Neutron Logs", by J.L. Brady, J.J. Kohring and R.J. North, SPE 36625, Society of Petroleum Engineers, 1996.

"Glossary of Terms & Expressions Used in Well Logging", Second Edition, Society of Professional Well Log Analysis, Oct., 1984.

"New Design for Compact Liquid–Gas Partial Separation: Downhole and Surface Installations for Artificial Lift Applications" by J.S. Weingarten, M.M. Kolpak, S.A. Mattison and M.J. Williamson, SPE 30637, Society of Petroleum Engineers, 1995.

"Development and Testing of a Compact Liquid–Gas Auger Partial Separator for Downhole or Surface Applications" by J.S. Weingarten M.M. Kolpak, S.A. Mattison and M.J. Williamson, Society of Petroleum Engineers, 1997.

"Slim Phase 4™", Sperry–Sun Drilling Services, 1994, 1995.

"New Design Expands Success of Slim Phase 4™ MWD Resisitivity Tool", Real–time–Slim Phase 4™, Sperry Sun Drilling Services, Fall 1995.

*Primary Examiner*—Donald E McElheny, Jr.
*Attorney, Agent, or Firm*—F. Lindsey Scott

[57] ABSTRACT

A method for generating a flow profile of a wellbore whereby a first measurement and a second measurement are collected for each point of a sequence of selected points along the wellbore. For each respective point in the sequence of points, the arithmetic difference between the first and second measurements collected for the respective point is calculated, and the summation of the arithmetic differences for the respective point and for each point which follows the respective point in the sequence of points is recorded. A flow profile of the wellbore is generated by plotting the value of the summations calculated for each point of the sequence of points, wherein the magnitude of the potential productive flow from that point in the wellbore, is substantially proportional to the magnitude of the slope of the profile corresponding to that point.

20 Claims, 4 Drawing Sheets

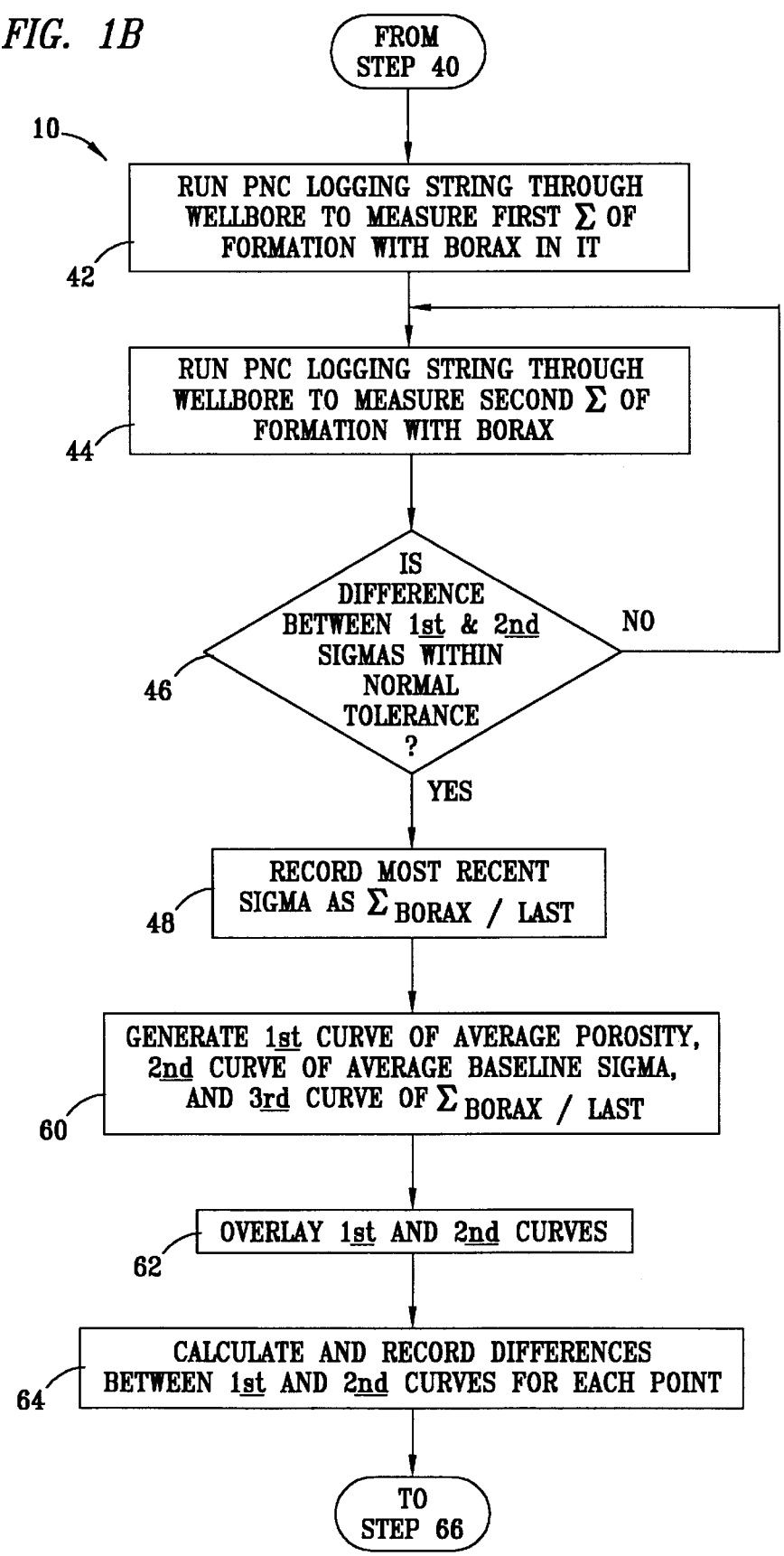

METHOD FOR GENERATING A FLOW PROFILE OF A WELLBORE FROM PULSED NEUTRON LOGS

FIELD OF THE INVENTION

The invention relates generally to a method for generating a flow profile of a wellbore and, more particularly, to a method for generating a flow profile of a wellbore from pulsed neutron logs.

BACKGROUND OF THE INVENTION

Natural gas production can be undesirable in wellbores in many oil and gas fields, such as those of the North Slope of Alaska. Such natural gas production can be particularly problematic in horizontal wells. Even when a horizontal wellbore is located a hundred feet below the gas-oil contact (GOC), undesirable gas production often still occurs. Possible sources of such gas production include channeling through a casing/borehole annulus when there is poor cement isolation, coning through higher permeability sections of the reservoir, suction of gas through permeable fault planes, or some combination thereof.

Production log flow profiles provide a valuable tool to evaluate well and reservoir performance, and to identify and eliminate undesirable gas production. Beginning with an analysis of the well's initial completion efficiency, downhole flow profiles provide zonal production allocation and analysis of break-through and coning events and are also used to check the mechanical integrity of completions. Production log surveys are commonly run to diagnose problems when anomalies in surface production rates are noticed. In such cases, the survey results are used to plan remedial actions to eliminate gas production and bring the well back to its optimum producing efficiency.

Production log flow profiles are generated using a conventional production logging tool string which typically includes spinner, capacitance, fluid density, temperature, and pressure sensors. The spinner is used to measure the total velocity of the fluid mixture; the capacitance and density sensors are used to determine the instantaneous holdups of water, oil, and gas; and the temperature sensor is used to identify fluid entries. To correctly interpret a flow profile from these sensors, the measured velocity must be converted to flow rate and individual velocities for each phase must be determined. While correlations for these interpretations are well understood in vertical wells, such correlations become less reliable as the angle of the well trajectory from vertical increases. Horizontal wells, thus, represent an extreme challenge for conventional production log interpretation.

The foregoing problems with interpreting production log flow profiles are further complicated by phase segregation, which can cause extreme fluctuations in spinner response, and minor trajectory deviations which generate widely changing individual phase velocities. Additionally, in horizontal wells having slotted liners, fluids can flow both inside the slotted liner and in the annulus between the liner and the openhole, resulting in variations in fluid velocity as the fluid enters and exits the slotted liner. Still further, restrictions inside the slotted liner can also cause erroneously high fluid velocities. Because the fluid velocity may vary as the fluid flows through the liner and/or the annulus rather than from the reservoir, the velocity sensed by the spinner may or may not reflect fluid flow from the reservoir, resulting in erroneous spinner counts and, consequently, erroneous flow rate interpretations.

In addition to conventional production logs, pulsed neutron capture (PNC) logs have been used to monitor gas, to detect cement channeling, and to locate gas and water entry by measuring thermal neutron capture cross-sections, such as sigma ($\Sigma$) formation, sigma ($\Sigma$) borehole, and porosity (e.g., thermal PNC porosity, or "TPHI"). In cement channel detection, for example, a PNC log is used to measure the formation sigma through a wellbore as a base pass. Then a high-capture cross-section solution, such as a saturate sodium borate solution, i.e. borax, is injected into the wellbore as a tracer to detect cement channels, and the sigma of the wellbore is measured again. Because the capture cross-section of borax is much higher than the capture cross-section of fresh water or oil, it produces a strong signature in the sigma measurements where the borax solution is injected. The sigma measurements made before and after the injection of the borax are overlaid, and the difference, or separation, between the measurements is used to detect the tracer in the cement channels. While the presence of separation is used as an indication of cement channels, the magnitude of the separation has not been evaluated.

While conventional PNC logs provide a measure of the porosity and sigma of a formation, they do not provide a direct measure of the permeability of a formation which is necessary to assess the flow profile and potential productivity of a wellbore.

Therefore, what is needed is a method for generating a flow profile of a wellbore from pulsed neutron logs which may be reliably interpreted to determine the flow profile of a wellbore, particularly of a horizontal wellbore having a slotted liner completion, and to determine from the flow profile, the flow rate and individual velocities for each phase of fluid flowing through the wellbore.

SUMMARY OF THE INVENTION

According to the present invention, production log data may be more reliably interpreted to determine a flow profile in a wellbore by a method whereby a first measurement and a second measurement are collected for each point of a sequence of selected points along the wellbore. For each respective point in the sequence of points, the arithmetic difference between the first and second measurements collected for the respective point is calculated, and the summation of the arithmetic differences for the respective point and for each point which follows the respective point in the sequence of points is recorded. A flow profile of the wellbore is generated by plotting the value of the summation calculated for each point of the sequence of points, wherein the magnitude of the potential productive flow from that point in the wellbore, is substantially proportional to the magnitude of the slope of the profile corresponding to that point.

BRIEF DESCRIPTION OF THE DRAWINGS

FIGS. 1A–1C are flowcharts of a method for determining the flow profile of a wellbore in accordance with the present invention.

DESCRIPTION OF THE PREFERRED EMBODIMENT

Conventional terminology will be used herein to refer to the order of a point in the sequence of the points in a wellbore wherein, for example, the uppermost point or the point closest to the wellhead will be referred to as the "first" point in the sequence, the next adjacent point as the "second" point, and so forth with the remaining points in sequence to the lowermost point or the point furthermost from the wellhead which will be referred to as the "last" point in the sequence. Points "preceding" a reference point include the first point and all points between the first point and the reference point. Points "following" a reference point include the last point and all points between the last point and the reference point.

Figure 1A:
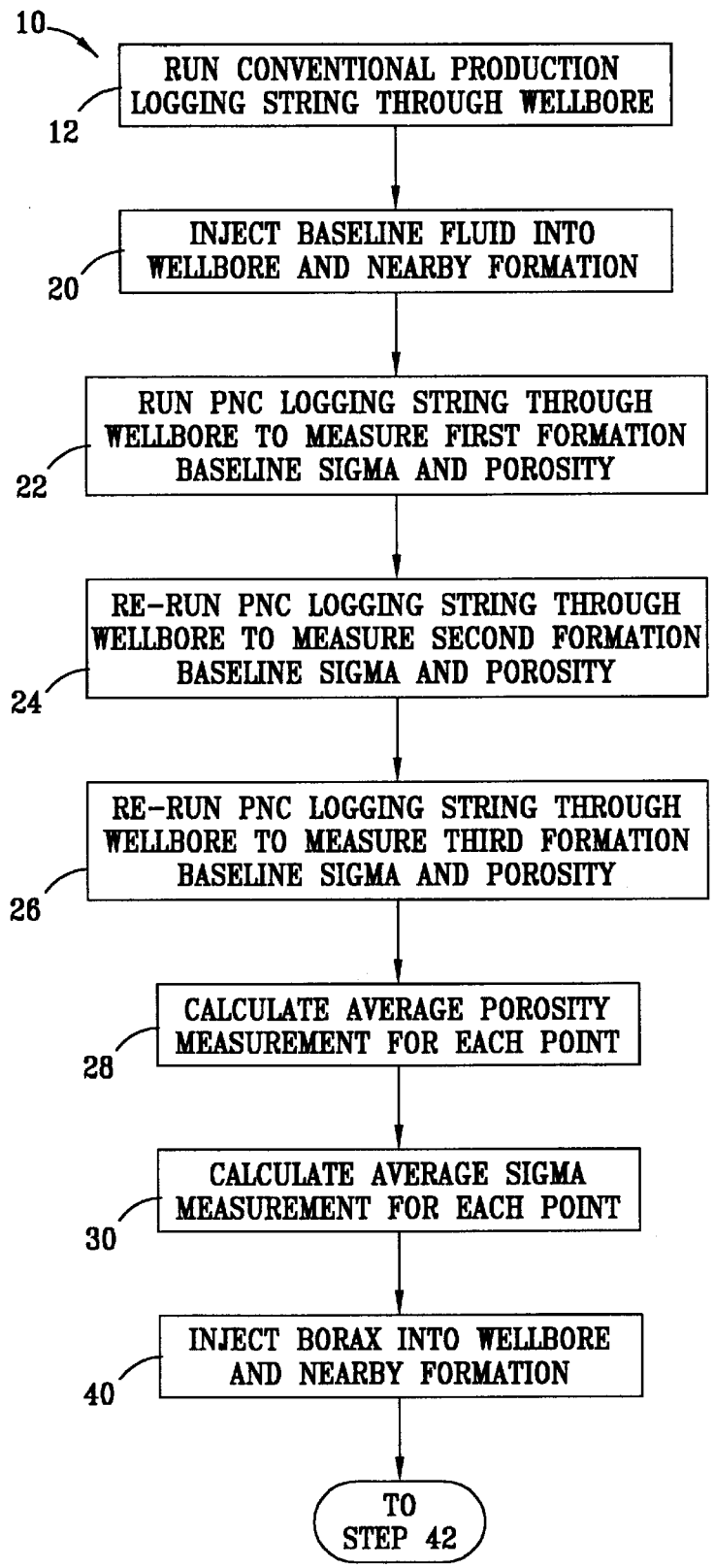
Figure 1C:
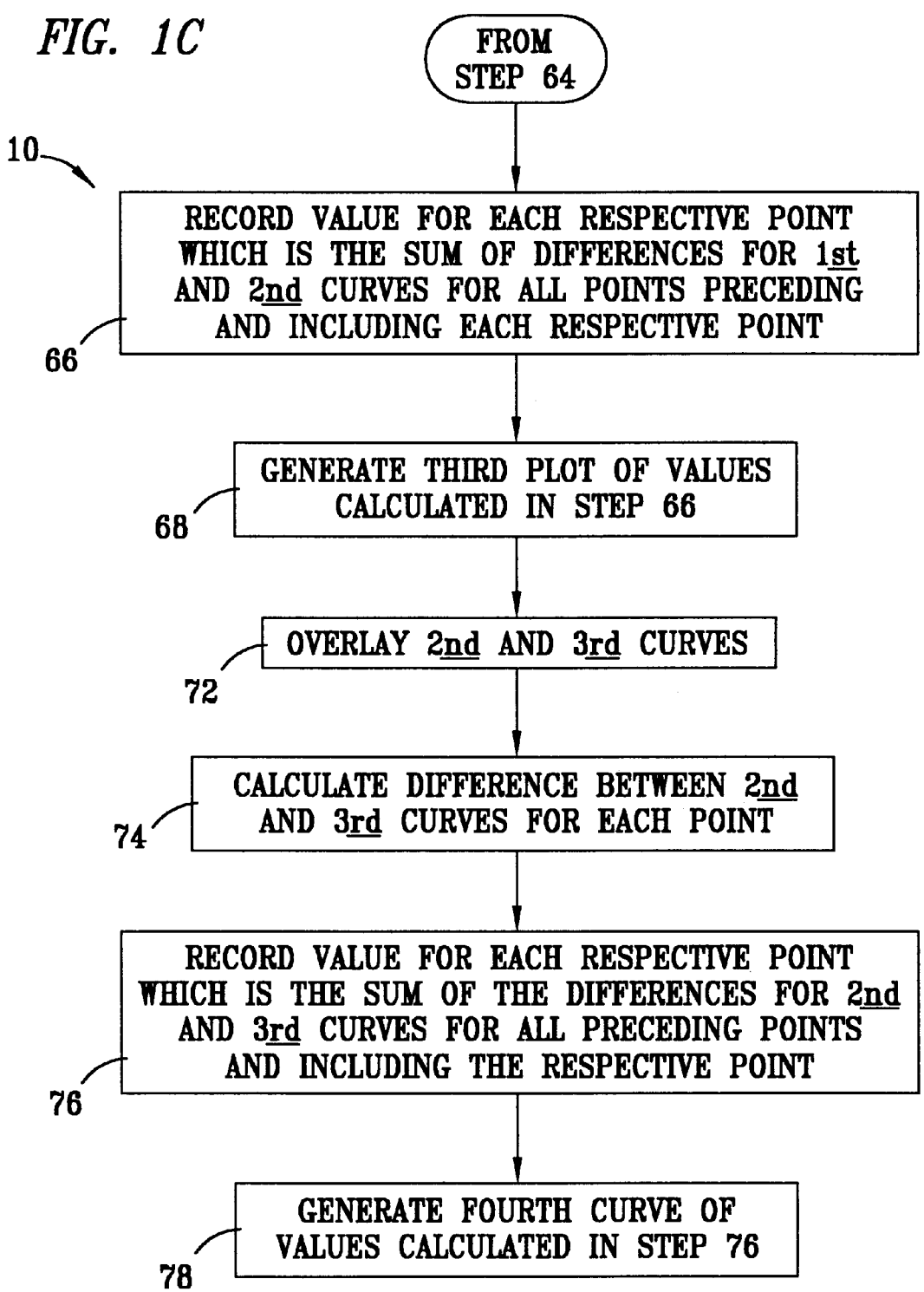

Referring to FIG. 1 of the drawings, the reference numeral 10 generally designates a flow chart for determining, in accordance with the present invention, the flow profile of a formation penetrated by either a vertical, slanted, or horizontal wellbore having either a cemented casing or a slotted liner. In step 12 of the method 10, a conventional production logging string is run through the wellbore while the wellbore is flowing to measure the temperature, pressure, and capacitance of the flowing wellbore, and to measure with a spinner the flow rate of fluid in the wellbore. Because the method of generating such conventional production logs is well know, it will not be described in further detail herein.

In step 20, a suitable baseline fluid, such as crude oil or, preferably, a saline solution, filtered seawater, or the like, which has a relatively low neutron capture cross section, is injected through the wellbore and into the nearby formation to displace gas from the wellbore and the nearby formation. The relatively low first neutron capture cross section of the baseline fluid is defined herein as being less than about 50 capture units and, typically, less than about 40 capture units and, preferably, less than about 30 capture units. In step 22, while the baseline fluid is being injected through the wellbore, a first producing pass is made in a manner well known in the art to run a conventional pulsed neutron capture (PNC) logging string through the wellbore to sequentially measure and record, at each point of a plurality of selected points along the wellbore, a first formation porosity measurement and a first formation sigma measurement, to thereby generate a first sequential series, $TPHI_1$, of porosity measurements and a first sequential series, $\Sigma_{baseline1}$, of formation sigma measurements measured while the baseline fluid is being injected through the wellbore. The selected points at which the measurements are made are spaced at intervals of from about one inch to about three feet, and typically from about three to about twelve inches, and preferably about six inches.

In steps 24 and 26, while the baseline fluid continues to be injected through the wellbore, two additional passes, similar to the pass made in step 22, are made to run the PNC logging string through the wellbore to sequentially measure and record, at approximately each of the points selectively measured and recorded along the wellbore in step 22, second and third formation porosity measurements, respectively, and second and third formation sigma measurements, respectively, to thereby generate second and third sequential series, $TPHI_2$ and $TPHI_3$, respectively, of porosity measurements and second and third sequential series, $\Sigma_{baseline2}$ and $\Sigma_{baseline3}$, respectively, of formation sigma measurements measured while the baseline fluid is being injected through the wellbore.

In step 28, the average value of $TPHI_1$, $TPHI_2$, and $TPHI_3$, is calculated and recorded for each point to produce a sequential series, $TPHI_{ave}$, of average porosity measurements. In step 30, the average value of $\Sigma_{baseline/1}$, $\Sigma_{baseline/2}$, and $\Sigma_{baseline/3}$, is calculated and recorded for each point to produce a sequential series, $\Sigma_{baseline/ave}$, of average formation sigmas measured with the baseline fluid in the wellbore and the nearby formation. While three passes are described in steps 22, 24, and 26, in a variation of the foregoing, more or less than three passes may be made similar to the passes made in steps 22, 24, and 26, with respect to porosity and/or the formation sigma measurements, and the average measurements of the passes may be calculated as in steps 28 and 30 to determine $TPHI_{ave}$ and/or $\Sigma_{baseline/ave}$.

In step 40, a suitable substance such as a saturated sodium chloride solution, a saturated sodium borate solution (i.e., borax water), or the like, hereinafter referred to as borax, which has a relatively high second neutron capture cross section, is injected through the wellbore and into the formation to displace gas and the baseline fluid from the wellbore and the nearby formation. The relatively high second neutron capture cross section of the borax is defined herein as being greater than about 70 capture units and, typically, greater than about 85 capture units and, preferably, greater than about 100 capture units and, moreover, as exceeding the relatively low neutron capture cross section of the baseline fluid used in steps 22, 24, and 26 by at least 40 capture units and, typically, by at least 50 capture units and, preferably, by at least 70 capture units. In step 42, while the borax is being injected through the wellbore, a first pass, similar to the pass made in step 22, is made to run the PNC logging string through the wellbore to sequentially measure and record, at approximately each of the points selectively measured and recorded along the wellbore in step 22, a first formation sigma measurement, and to generate a first sequential series, $\Sigma_{borax/1}$, of formation sigma measurements measured while borax is being injected through the wellbore. In step 44, a second pass, similar to the pass made in step 42, is made to run the PNC logging string through the wellbore to sequentially measure and record, at approximately each of the same points selectively measured and recorded along the wellbore in step 42, a second sigma measurement, thereby generating for the wellbore a second sequential series, $\Sigma_{borax/2}$, of formation sigmas measured while borax is injected through the wellbore.

In step 46, $\Sigma_{borax/1}$, and $\Sigma_{borax/2}$ are compared and a determination is made whether the difference between $\Sigma_{borax/1}$, and $\Sigma_{borax/2}$ is significant or is merely the result of normal measurement tolerances, e.g., within about ±5 capture units and, typically, within about ±2 capture units and, preferably, within about ±1 capture unit. If in step 46 a determination is made that the difference between $\Sigma_{borax/1}$, and $\Sigma_{borax/2}$ is significant, then step 44 may be repeated. Step 46 is then repeated with respect to the two sequential series of formation sigmas most recently measured with borax injected through the wellbore. If in step 46 a determination is made that the difference between the two sequential series of formation sigmas most recently measured while borax is being injected through the wellbore is merely the result of normal measurement tolerances, then in step 48, the sequential series of formation sigmas most recently measured with borax injected through the wellbore is recorded as $\Sigma_{borax/last}$. In a variation of the foregoing, steps 44 and 46 may be eliminated.

Figure 2:
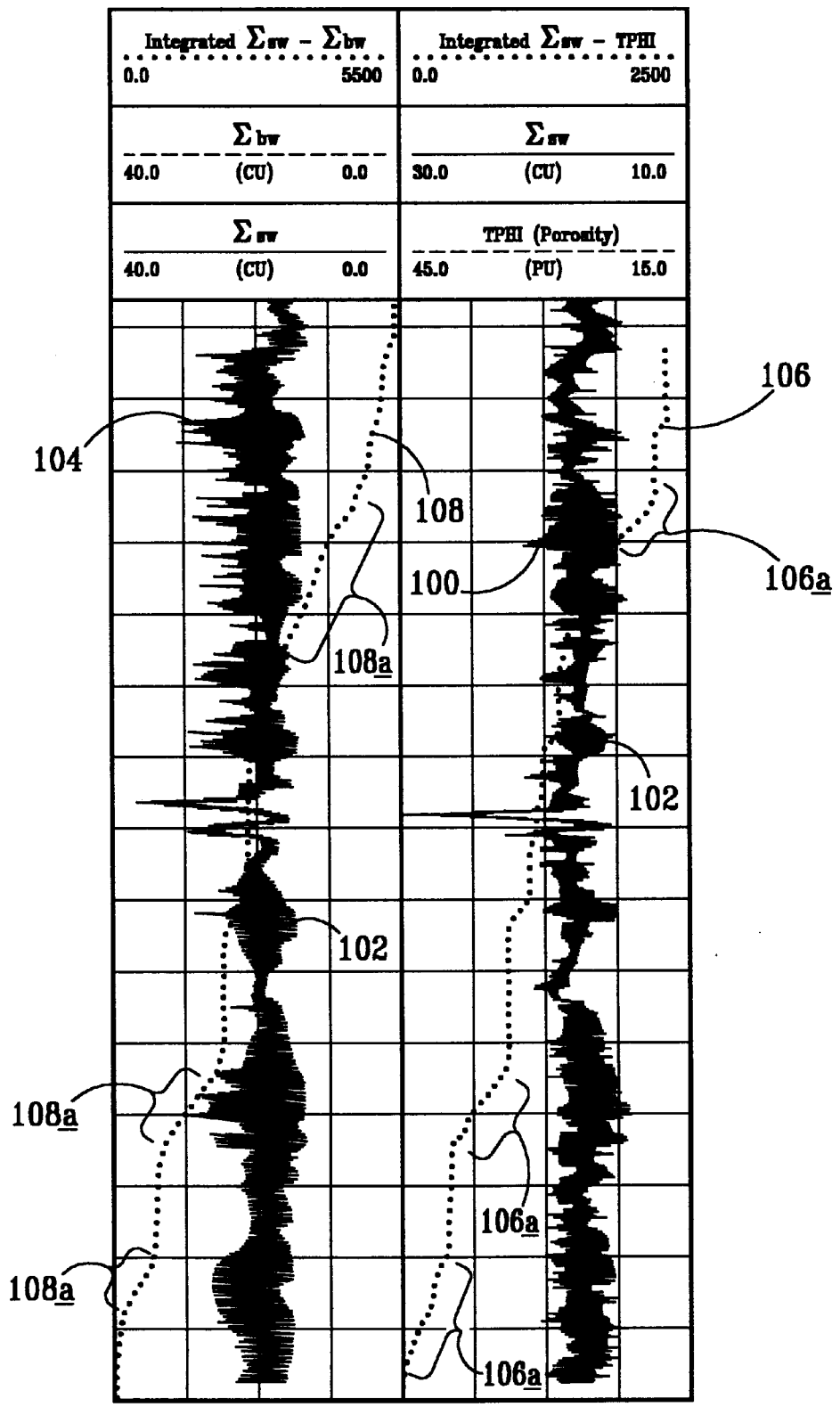
FIG. 2 is a plot of data derived using the method of FIGS. 1A–1C.

In step 60, a "porosity" curve 100, a "baseline" curve 102, and a "borax" curve 104, shown in FIG. 2, are generated, in a manner well known in the art, from the $TPHI_{ave}$, $\Sigma_{baseline/ave}$, and the $\Sigma_{borax/last}$, respectively, calculated for each point. In step 62, the porosity and baseline curves 100 and 102, respectively, are optionally scaled in a manner well known in the art and overlaid, as exemplified in FIG. 2 and, in step 64, the arithmetic difference between the $TPHI_{ave}$ and the $\Sigma_{baseline/ave}$ is calculated and recorded for each point. In step 66, a value is recorded for each respective point in the sequence points, each of which values represents the integration of the separation between the $TPHI_{ave}$ and $\Sigma_{baseline/}$ $_{ave}$ curves from the last point to the respective point, which integration is calculated as the summation of the differences calculated in step 64 for the respective point and each point which follows the respective point in the sequence of points. In step 68, a first liquid flow profile curve 106 is generated of the sequence of values calculated for each point in step 66, and is scaled in a manner well known in the art. The first liquid flow profile curve 106 represents a PNC liquid flow profile of the wellbore based on the integration of the differences between the TPHI$_{ave}$ and the $\Sigma_{baseline/ave}$, wherein the magnitude of the potential productive flow from that point in the wellbore is substantially proportional to the magnitude of the slope of the profile corresponding to that point in the first liquid flow profile curve 106. For example, the portions 106a of the first liquid flow profile curve 106 depicted in FIG. 2 indicate that zones of the formation corresponding to those portions are permeable and have a high probability of being productive.

In step 72, the baseline curve 102 and borax curve 104 are optionally overlaid, as exemplified in FIG. 2 and, in step 74, the arithmetic difference between the $\Sigma_{baseline/ave}$ and the $\Sigma_{borax/last}$ is calculated and recorded for each point of the respective curves. In step 76, a value is recorded for each respective point in the sequence points, each of which values represents the integration of the separation between the $\Sigma_{baseline/ave}$ and the $\Sigma_{borax/last}$ curves from the last point to the respective point, which integration is calculated as the summation of the differences calculated in step 74 for the respective point and each point which follows the respective point in the sequence of points. In step 78, a second liquid flow profile curve 108 is generated of the sequence of values calculated for each point in step 76, and is scaled in a manner well known in the art. The second liquid flow profile curve 108 represents a PNC liquid flow profile of the wellbore based on the integration of the differences between the $\Sigma_{baseline/ave}$ and the $\Sigma_{borax/last}$, wherein the magnitude of the potential productive flow from that point in the wellbore, is substantially proportional to the magnitude of the slope of the profile corresponding to that point in the curve 108. For example, the portions 108a of the second liquid flow profile curve 108 depicted in FIG. 2 indicate that zones of the formation corresponding to those portions are permeable and have a high probability of being productive. It can be appreciated that the first and second liquid flow profiles curves 106 and 108, respectively, provide substantially similar information, and that either may be used for predicting the flow profile of a wellbore, though both would be preferably be used.

In the practice of the method of the present invention, the foregoing first and second liquid flow profile curves 106 and 108, respectively, may be used to more reliably interpret the conventional production log generated for the wellbore in the foregoing step 12. For example, it can be appreciated that, because the second liquid flow profile curve 108 is derived from logs made while injecting liquid into the wellbore, the resulting curves correlate primarily with the liquid, rather than the gas, productivity of the formation. In contrast, the spinner profile developed during the conventional production logging of the wellbore in the foregoing step 12 is responsive to the flow of both liquid and gas in the wellbore. If the first liquid flow profile curve 106 and/or the second liquid flow profile curve 108 are overlaid with the spinner profile, then a point in the wellbore where there is a change in the separation between the profiles suggests that there may be a zone of gas entry at that point. Strong cooling recorded by the temperature log generated in step 12 may be used to confirm that separation between the profiles is the result of a gas entry zone. Additionally, the relative rates of the gas and liquid in the wellbore may be approximated quantitatively by the differences between the spinner profile and the first and/or the second liquid flow profile curves 106 or 108. Perforations in cemented casing may be more judiciously made for producing oil by perforating the cemented casing in zones where the slope of first and second liquid flow profile curves are relatively high. Still further, intervals where the first liquid flow profile curve 106 exceeds the second liquid flow profile curve 108 are indicative of near wellbore damage, of ineffective perforations, or of completion problems. Such uses are discussed in greater detail in a paper, incorporated herein by reference, published by the Society of Petroleum Engineers in October 1996 and entitled "Improved Production Log Interpretation in Horizontal Wells Using Pulsed Neutron Logs" (SPE 36625) by J. L. Brady, J. J. Kohring, and R. J. North. Because such uses are discussed in the paper, they will not be discussed in greater detail herein.

It is understood that several variations may be made in the foregoing without departing from the spirit or the scope of the invention. For example, the first and second liquid flow profile curves 106 and 108, respectively, may be differentiated to provide a profile in which separation is depicted with reference to Cartesian coordinates rather than the slope of the curve. The first and second liquid flow profile curves 106 and 108 as well as the differentiated profile may also be smoothed over in a manner well known in the art so that they may be more readily interpreted. The first and second liquid flow profile curves 106 and 108 may also be generated without overlying the curves 100, 102, and 104. In step 66, a value may be recorded for each respective point in the sequence of points, each of which values represents the integration of the separation between the TPHI$_{ave}$ and $\Sigma_{baseline/ave}$ curves from the first point to the respective point, which integration is calculated as the summation of the differences calculated in step 64 for the respective point and each point which precedes the respective point in the sequence of points. Similarly, in step 76, a value may be recorded for each respective point in the sequence of points, each of which values represents the integration of the separation between the $\Sigma_{borax/ave}$ and $\Sigma_{baseline/ave}$ curves from the first point to the respective point, which integration is calculated as the summation of the differences calculated in step 74 for the respective point and each point which precedes the respective point in the sequence of points. The calculations performed in steps 28–30, 64–68, and in 74–78 may be performed on selected points, such as every second or every third point, for quicker analysis.

The practice of the present invention provides a profile which may be readily and reliably interpreted from a visual observation and that may easily combined with conventional production logs to provide additional and more reliable information about a wellbore than may be acquired from a conventional production log alone.

Having thus described the present invention by reference to certain of its preferred embodiments, it is noted that the embodiments disclosed are illustrative rather than limiting and that many variations and modifications are possible within the scope of the present invention. Many such variations and modifications may be considered obvious and desirable by those skilled in the art based upon a review of the foregoing description of preferred embodiments.

What is claimed is:

1. A method for generating a flow profile of a wellbore, comprising the following steps:

(a) collecting a first measurement and a second measurement for each point of a sequence of selected points along the wellbore;

(b) calculating for each respective point in the sequence of points the arithmetic difference between the first and second measurements collected for the respective point;

(c) recording for each respective point in the sequence of points the summation of the arithmetic differences for the respective point and for each point of a plurality of points selected from the group consisting of a first plurality of points which precedes the respective point in the sequence of points and a second plurality of points which follows the respective point in the sequence of points; and (d) generating a liquid flow profile of the wellbore by plotting the value of the summations calculated for each point of the sequence of points, wherein the magnitude of the potential productive flow from a point in the wellbore is substantially proportional to the magnitude of the slope of the profile corresponding to that point.

2. The method of claim 1 wherein the first measurements are first sigma measurements and the second measurements are second sigma measurements.

3. The method of claim 2 wherein the step of collecting comprises the steps of:

injecting a first substance having a first neutron capture cross section into the wellbore and into the formation to substantially displace gas from the wellbore and the nearby formation;

running a PNC logging string through the wellbore to measure and record the first sigma measurement at each point of the sequence of selected points along the wellbore;

injecting a second substance having a second neutron capture cross section into the wellbore and into the formation to substantially displace gas and the first substance from the wellbore and the nearby formation, wherein the second neutron capture cross section is greater the first neutron capture cross section; and re-running the PNC logging string through the wellbore to measure and record the second sigma measurements at each point of the sequence of selected points along the wellbore.

4. The method of claim 3 wherein at least a portion of the step of running is performed during the step of injecting a first substance, and at least a portion of the step of re-running is performed during the step of injecting a second substance.

5. The method of claim 3 wherein the first substance has a neutron capture cross section of less than about 50 capture units and is selected from the group consisting of a saline water solution and a liquid hydrocarbon.

6. The method of claim 3 wherein the second substance has a neutron capture cross section of more than about 70 capture units and is selected from the group consisting of a saturated sodium borate solution and a saturated sodium chloride solution.

7. The method of claim 2 wherein the step of collecting comprises the steps of:

running a PNC logging string through the wellbore to measure and record the first sigma measurement at each point of the sequence of selected points along the wellbore;

injecting a substance into the wellbore and into the formation to substantially displace gas from the wellbore and the nearby formation;

re-running the PNC logging string through the wellbore to measure and record the second sigma measurement at each point of the sequence of selected points along the wellbore, the substance being selected so that for each point the second sigma is substantially greater than or equal to the first sigma.

8. The method of claim 7 wherein at least a portion of the step of re-running is performed during the step of injecting a substance.

9. The method of claim 7 wherein the substance has a neutron capture cross section of more than about 70 capture units and is selected from the group consisting of a saturated sodium borate solution and a sodium chloride solution.

10. The method of claim 7 wherein each second sigma measurement is an initial second sigma measurement and steps of injecting and re-running are repeated to generate for each point a subsequent second sigma measurement, the method further comprising the steps of:

determining for each point whether the difference between the initial second sigma measurement and the subsequent second sigma measurement is within normal tolerances;

upon a determination for each point that the difference between the initial second sigma measurement and the subsequent second sigma measurement is within normal tolerances, proceeding to the step of calculating.

11. The method of claim 1 wherein the first measurements are sigma measurements and the second measurements are porosity measurements.

12. The method of claim 11 wherein the step of collecting comprises the step of running a PNC logging string through the wellbore to measure and record the sigma measurement and the porosity measurement at each point of the sequence of selected points along the wellbore.

13. The method of claim 12 wherein the step of collecting further comprises, before the step running, the step of injecting a substance into the wellbore and into the formation to substantially displace gas from the wellbore and the nearby formation.

14. The method of claim 13 wherein at least a portion of the step of running is performed during the step of injecting.

15. The method of claim 13 wherein each porosity measurement is an initial porosity measurement, and wherein the steps of injecting and running are repeated to generate a subsequent porosity measurement for each point, and the method further comprises the steps of calculating the average value of the initial and subsequent porosity measurements and using the calculated average value in subsequent steps as the porosity measurement.

16. The method of claim 13 wherein the substance has a neutron capture cross section of less than about 50 capture units and is selected from the group consisting of a saline water solution and a liquid hydrocarbon.

17. The method of claim 1 wherein the wellbore is a substantially horizontal wellbore.

18. The method of claim 1 wherein the first measurements are baseline sigma measurements.

19. The method of claim 1 wherein the selected points along the wellbore are spaced at intervals of from about one inch to about three feet.

20. The method of claim 1 wherein the selected points along the wellbore are spaced at intervals of from about three inches to about twelve inches.

* * * * *